(12) United States Patent
Thompson et al.

(10) Patent No.: US 7,035,867 B2
(45) Date of Patent: Apr. 25, 2006

(54) DETERMINING REDUNDANCIES IN CONTENT OBJECT DIRECTORIES

(75) Inventors: Mark R. Thompson, Chandler, AZ (US); Nathan F. Raciborski, Jackson, WY (US)

(73) Assignee: Aerocast.com, Inc., Horsham, PA (US)

(*) Notice: Subject to any disclaimer, the term of this patent is extended or adjusted under 35 U.S.C. 154(b) by 386 days.

(21) Appl. No.: 10/002,290

(22) Filed: Nov. 28, 2001

(65) Prior Publication Data

US 2003/0101162 A1 May 29, 2003

(51) Int. Cl.
*G06F 17/30* (2006.01)
(52) U.S. Cl. .................. 707/102; 707/104.1; 704/205; 704/236; 708/404; 708/405
(58) Field of Classification Search .................... 707/2, 707/102, 104.1, 200, 205, 101; 708/403–405; 382/100, 280; 704/205, 236
See application file for complete search history.

(56) References Cited

U.S. PATENT DOCUMENTS

| 5,050,212 | A |   | 9/1991  | Dyson |
|---|---|---|---|---|
| 5,408,642 | A |   | 4/1995  | Mann |
| 5,454,000 | A |   | 9/1995  | Dorfman |
| 5,530,757 | A |   | 6/1996  | Kraweczyk |
| 5,918,223 | A | * | 6/1999  | Blum et al. ..................... 707/1 |
| 5,978,791 | A |   | 11/1999 | Farber et al. |
| 6,006,245 | A | * | 12/1999 | Thayer ........................ 708/404 |
| 6,122,738 | A |   | 9/2000  | Millard |
| 6,226,391 | B1 | * | 5/2001  | Dydyk et al. ................ 382/125 |
| 6,381,367 | B1 | * | 4/2002  | Ryan ........................... 382/232 |
| 6,424,725 | B1 | * | 7/2002  | Rhoads et al. ............... 382/100 |
| 6,647,128 | B1 | * | 11/2003 | Rhoads ........................ 382/100 |
| 6,675,174 | B1 | * | 1/2004  | Bolle et al. ............... 707/104.1 |
| 6,748,360 | B1 | * | 6/2004  | Pitman et al. ............... 704/270 |
| 2001/0053236 | A1 | * | 12/2001 | Rhoads ........................ 382/100 |
| 2002/0032864 | A1 | * | 3/2002  | Rhoads et al. ............... 713/176 |
| 2002/0049753 | A1 | * | 4/2002  | Burrows ......................... 707/3 |
| 2002/0073106 | A1 | * | 6/2002  | Parker et al. ............... 707/200 |
| 2002/0082731 | A1 | * | 6/2002  | Pitman et al. ................. 700/94 |
| 2002/0083060 | A1 | * | 6/2002  | Wang et al. .................. 707/10 |

OTHER PUBLICATIONS

Chua et al., Content-based Retreival of Segmented Images, ACM, published 1994. pp. 211-218.*
Pfeiffer et al., Automatic Audio Content Analysis, ACM, published 1996. pp. 21-30.*
Srinivasan et al., Towards robust Features for Classifying Audio in the CueVideo System, ACM published 1999. pp. 393-400.*

* cited by examiner

*Primary Examiner*—Leslie Wong
(74) *Attorney, Agent, or Firm*—Townsend and Townsend and Crew LLP

(57) ABSTRACT

A system for identifying files can use fingerprints to compare various files and determine redundant files. Frequency representations of portions of files can be used, such as Fast Fourier Transforms, as the fingerprints.

17 Claims, 5 Drawing Sheets

DETERMINING REDUNDANCIES IN CONTENT OBJECT DIRECTORIES

This invention relates generally to fingerprinting files for identification, more specifically, this invention relates to determining redundancies in file directories.

BACKGROUND

One of the drawbacks to computer systems is the vast number of redundant files that are repeatedly copied and stored in multiple directories. While attempts are made to identify these files by a unique name or characteristic, what often results is that redundant files are saved multiple times in a directory or computer system. As a result, a waste of memory occurs in storing the redundant files. Furthermore, it is not uncommon for files to either innocently or intentionally be misidentified in a computing system. As a result, files residing on the system may have an incorrect identifier that prevents them from being correctly or efficiently recognized by various users or application programs.

As one example, in the industry of downloading music files across the internet, it is not uncommon for a new artist to store their new song under the name of a popular artist. The theory is that by storing the new song under the name of the more popular artist, more people will likely download that particular file and listen to the misidentified song of the new artist. This is commonly referred to as "Napster bombing". Apparently, the new artists feel that by Napster bombing there is a greater chance of being discovered by the listening public. In peer-to-peer networks, for example, one can access the directory of another user and view the available files of that user. Thus, the user who controls the physical directory can misidentify songs either intentionally or purposefully. A Napster bomber involved in a peer-to-peer network connection with another user can misidentify his or her new song and allow a second user to download that file for listening. Thus, the second user can waste a good deal of time in obtaining a copy of a song that was misidentified.

As another example, a memory system that contains redundant data can waste storage space that could be better used for nonredundant data. For example, as files are copied and stored during normal processes, they are given new names by users for easier identification. As a result, multiple files are stored on a computer system that contain the same data. Days, months, or years later, it is difficult to know from the file characteristics or identifiers, such as file names, whether the files are redundant or not. Thus, they are simply maintained on the computing system by the housekeeping programs.

With the advent of downloading audio and video files across computer networks for viewing by users on their home computers, there is a great potential for not only storing redundant files but also Napster bombing video files. As a result, a user could potentially waste a good deal of time, for example in downloading a misidentified video file which has a substantially greater time involved in downloading as compared to a less memory intensive audio file. Furthermore, the servers or caching computers that will store data or content files such as video files will have limited memory capacity for storing purposes. Thus, it would be desirable to be able to eliminate any unnecessary redundant files.

SUMMARY

One embodiment of the invention provides a system for eliminating redundant files stored in a computer directory. This embodiment of the invention can be accomplished by accessing multiple files stored on memory, wherein each of the files is configured to be identified by a fingerprint; determining a fingerprint for each of the files stored on the memory; establishing a standard, such as a redundancy standard, to indicate when any two fingerprints are redundant; comparing the fingerprints determined for each of the files; and determining which files are redundant based upon the comparison.

Redundant files can also be removed or deleted from the memory in one aspect. Furthermore, various types of fingerprints could be utilized, such as Fast Fourier Transform (FFT) as the fingerprint, utilizing the watermark as the fingerprint, or, utilizing CRC as the fingerprint.

In one embodiment, the system can be utilized to access various file formats such as audio files or video files.

In another embodiment, a identifier for a file can be provided by accessing the file; deriving a frequency representation of the file; providing a file name for the file; providing the file name in a directory; and, associating the frequency representation of the file with the file name so that the frequency representation is accessible via the directory.

Again, in various embodiments of the invention a Fourier Transform could be used, an FFT could be used, and a Discrete Fourier Transform (DFT) could be used. Furthermore, the frequency representation could be included as metadata in an address listing.

In another embodiment of the invention a method of searching for a file can be utilized by obtaining a first frequency representation of a desired file; accessing a first unknown file; obtaining a second frequency representation of the unknown file; comparing the first frequency representation of the desired file with the second frequency representation of the unknown file; and, determining from the comparison whether the unknown file is the desired file.

Furthermore, in various aspects of this embodiment, the frequency representation can be obtained by different algorithms. For example, it could be performed utilizing an FFT, a Discrete Fourier Transform (DFT), or the like.

In another aspect of this embodiment, frequency comparisons can be performed by comparing a range of frequencies of the first and second frequency representations so as to determine whether they are equivalent.

Furthermore, this embodiment can utilize a decoder to decode a file prior to obtaining the frequency representation for that file.

DESCRIPTION

With the advent of downloading audio and especially video files across computer networks, it is ever more important to be able to correctly identify a proper file. Namely, a great deal of computing resources are required in the downloading of such files, as they are very memory intensive and not only require a good deal of time to download but consequently occupy a good deal of computing bandwidth. Thus, it is inefficient to download files that have been misidentified and do not serve the purpose of the user who requests the misidentified file. Furthermore, the storage space on computing systems is an ever present problem and it is beneficial when redundant files can be identified and removed from a computer's memory to create additional storage space.

Figure 1:
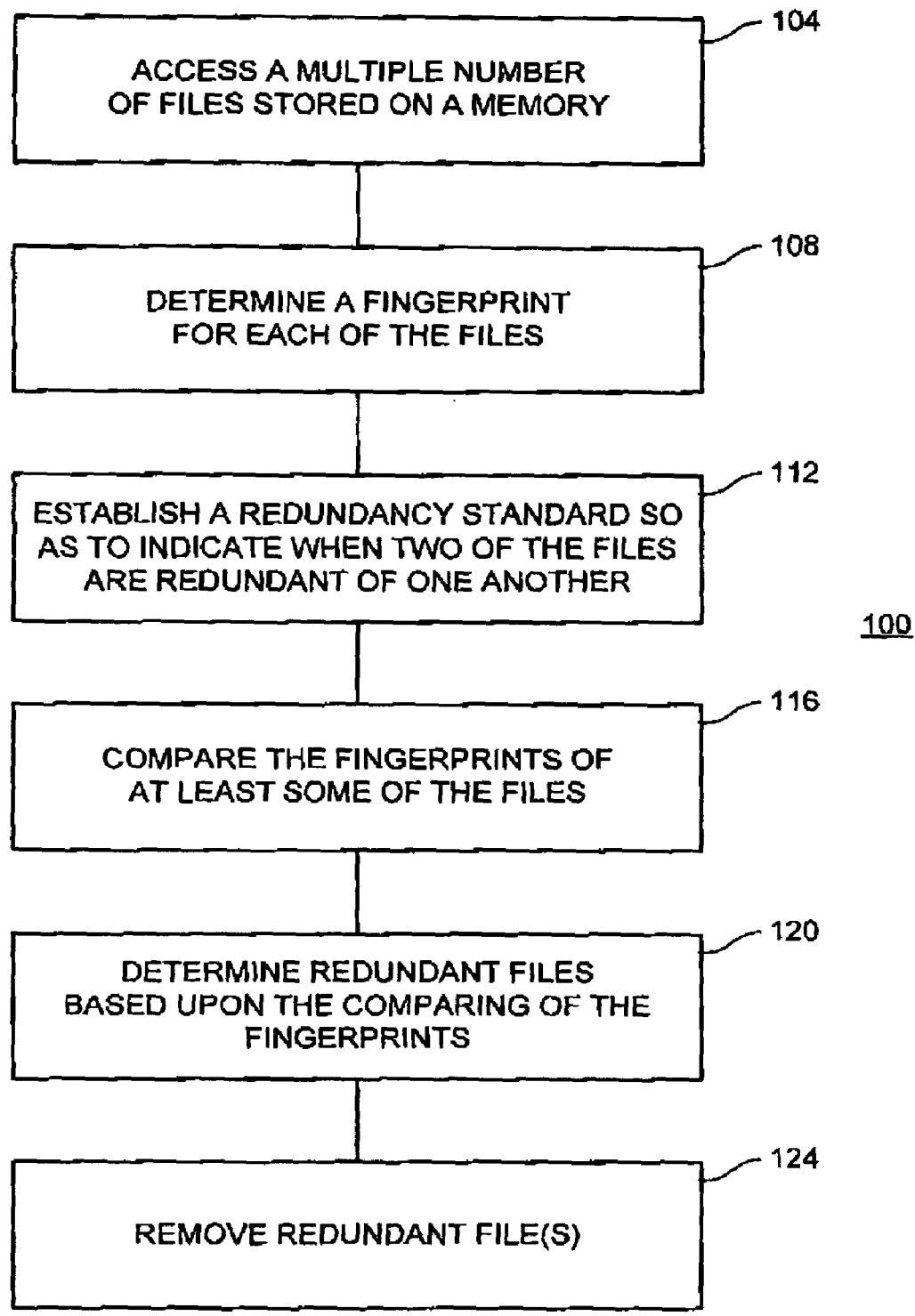
FIG. 1 provides a flowchart illustrating a method for removing redundant files according to one embodiment of the invention.

In one embodiment of the invention, a method is provided to identify redundant files in a computing system. Such a method can be useful in identifying files on a user's own computer as well as identifying files on the computer of another. In FIG. 1, a method 100 is illustrated in which according to block 104 a multiple number of files stored on a computer's memory is accessed. For example, the files on a user's own computer can be accessed. According to block 108, a fingerprint for each of the files is then determined.

The determination of a fingerprint can take a variety of forms. As one example, a FFT can be utilized. The FFT can be generated according to any commercially available program or chip for computing FFTs such as FFTW version 2.1.3 developed at MIT by Matteo Frigo and Steven G. Johnson and currently available for free at the ≦FFTW.ORG≧ website. (The algorithms for computing Fourier Transforms, Discrete Fourier Transforms and Fast Fourier Transforms are presented, for example, in *Signals and Systems,* by Oppenheim and Willsky, Prentice Hall 1983.)

With an FFT, for example, the audio characteristics of a song could be sampled and a FFT could be generated for that particular song. Thus, a FFT characteristic of that file could be generated. The FFT characteristics will vary depending on the portion of the file that is utilized to generate the FFT. Furthermore, the length of the segment of the song that is utilized can impact the resulting FFT.

As another example, a watermark could be utilized as the fingerprint for a file. Namely, a watermark that is placed on a file could not only serve to identify whether the file is authentic, but also it could be utilized to identify the characteristics of that file. Furthermore a CRC could be generated for a particular file so as to derive a unique identifier for that file.

In block 112, a redundancy standard is established so as to indicate when two files are redundant of one another. For example, in the case of an FFT, the requirements for sampling a file could be utilized to state that the first five minutes of playing time of the file are sampled at a specific sampling rate. In addition, the resulting frequency histogram that is generated can vary by a predetermined percentage in comparison of the histograms of the two files. For example, if a histogram for file a is generated and histogram for file b is generated, a common pattern of the histograms may vary, for example, by five percent, and still be considered a redundant file. The various characteristics that are utilized for determining whether files are redundant can be selected by the user. For example, stricter requirements could be utilized, such as an exact match between fingerprints of two files in determining whether they are redundant of one another.

In block 116 the fingerprints of at least some of the files can be compared. Thus, as illustrated in block 120 of FIG. 1, a determination can be made based on the comparison in block 116 as to whether any two files are redundant of one another. The redundancy standard that was established can be utilized to provide criteria for determining in the comparison whether the two fingerprints satisfy the criteria of the established redundancy standard. Alternatively, even without an established standard, the results of a comparison could be displayed for viewing by a user to allow the user to determine whether the fingerprints are sufficiently similar to be considered redundant files.

In block 124 any files that have been determined to be redundant can be removed. For example, a list of files and file characteristics could be displayed for viewing by the user showing which files are redundant of one another. Thus, the user could make the final determination as to whether to remove files or keep them on the file system. It is envisioned that in most instances, such redundant files will simply be deleted from the memory and file directories of the computer system so as to free space for use by new files. Alternatively, some files may be retained even though they satisfied the redundancy standard.

The method of determining redundant files lends itself for use with any number of data files that can be fingerprinted. For example, audio files can easily be fingerprinted utilizing an FFT algorithm. Similarly, video files could be fingerprinted with an FFT algorithm. In the case of an audio file, a redundancy standard could be established by establishing a range of frequencies identified in the FFT and the percentage of the level of those frequencies that must match.

Once a fingerprint has been generated, it can be retained and appended as metadata to the file indicator. Thus, it could be associated with a file name in a file directory. Consequently, one could click on an FFT indicator next to a file name in a Microsoft Windows file directory to bring up a FFT fingerprint for that file. This would simply involve linking the FFT data to the file name in the file directory. Thus, the fingerprint could be stored with the file in a database. As a result of this association, the fingerprint and file name or other identifier can be cataloged in a database. For example, if a database of video files is created by an entity on the internet, that entity could create a master database of content objects offered for streaming to viewing customers. Thus, the entity could distribute content object files across its system and associate a fingerprint with each of the files. The master database could retain a fingerprint for each file as well and utilize the fingerprint for housekeeping functions. For example, such housekeeping functions could be performed on remote databases such as caching servers to remove any redundant content files stored on the caching.

Figure 2:
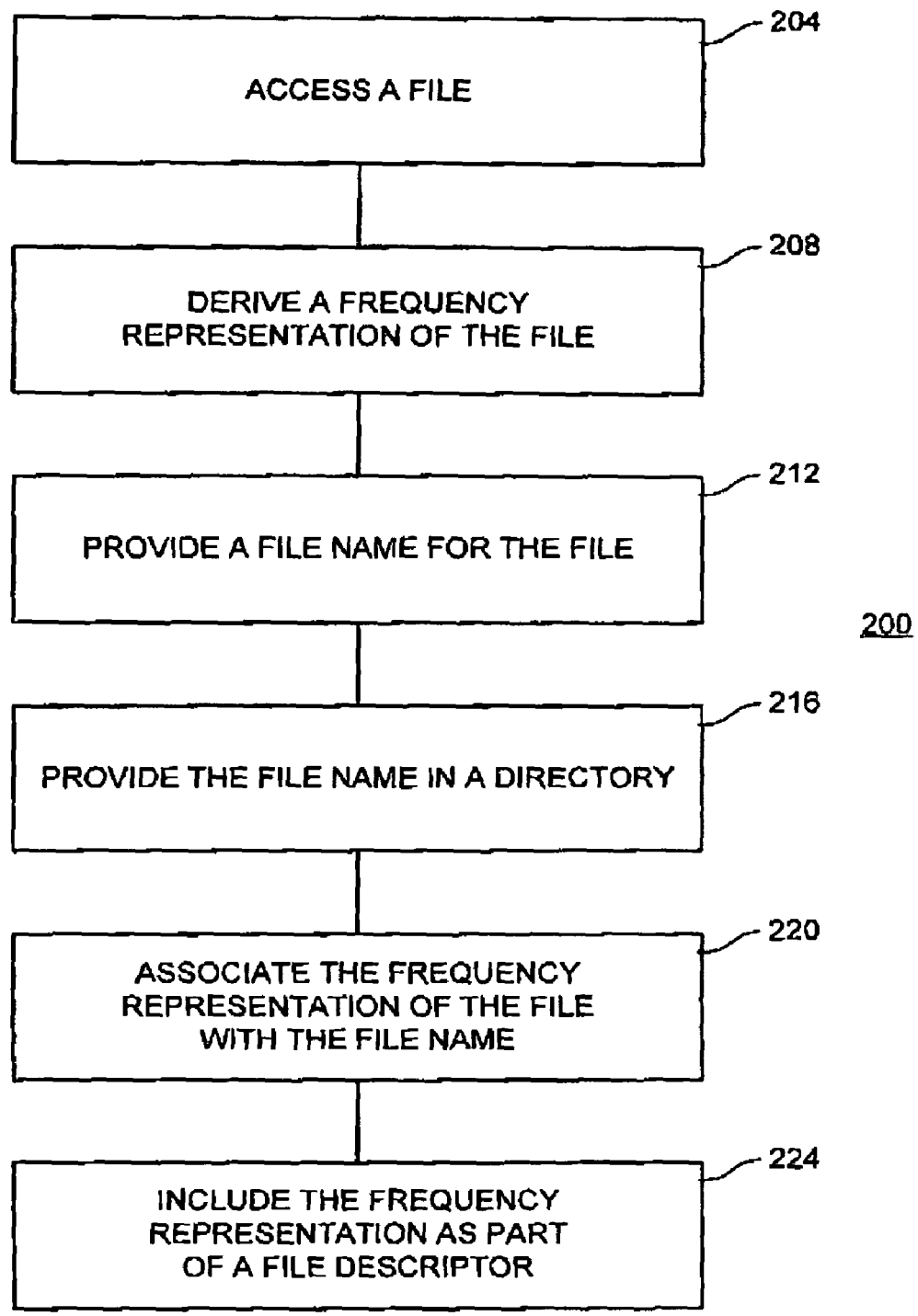
FIG. 2 provides a flowchart illustrating a method for identifying files in a directory according to one embodiment of the invention.

In FIG. 2, an embodiment of the invention for identifying a file is described. In flowchart 200 of FIG. 2, a file is accessed as shown by block 204. For example, the file might simply be accessed from a file directory utilizing its file name as an identifier. A frequency representation of the file can then be derived as indicated in block 208. As one example, a FFT could be generated utilizing the file data so as to generate FFT data for that file. In block 212 a file name is provided for the file. Typically, this will simply involve using the same name that was previously used to access the file. However, one could easily provide a new name for the file. In block 216 the file name can be disposed in a directory for the file. Again, this could simply involve saving the file under a new name in a directory. In addition, as shown in block 220, the frequency representation of the file is associated with the file name. As noted above, this could occur by linking the frequency representation data generated by an FFT with the file name given in the file directory. Thus, anyone wishing to view further identifiers of a particular file that has an associated frequency representation can pull up the FFT data or other frequency representation data and view the frequency characteristics for that file. In block 224 the frequency representation could be summarized with an indicator that is displayed as part of a file descriptor. For example, a file description in an internet address could be provided in which frequency data is related as metadata as part of that file address.

Figure 3:
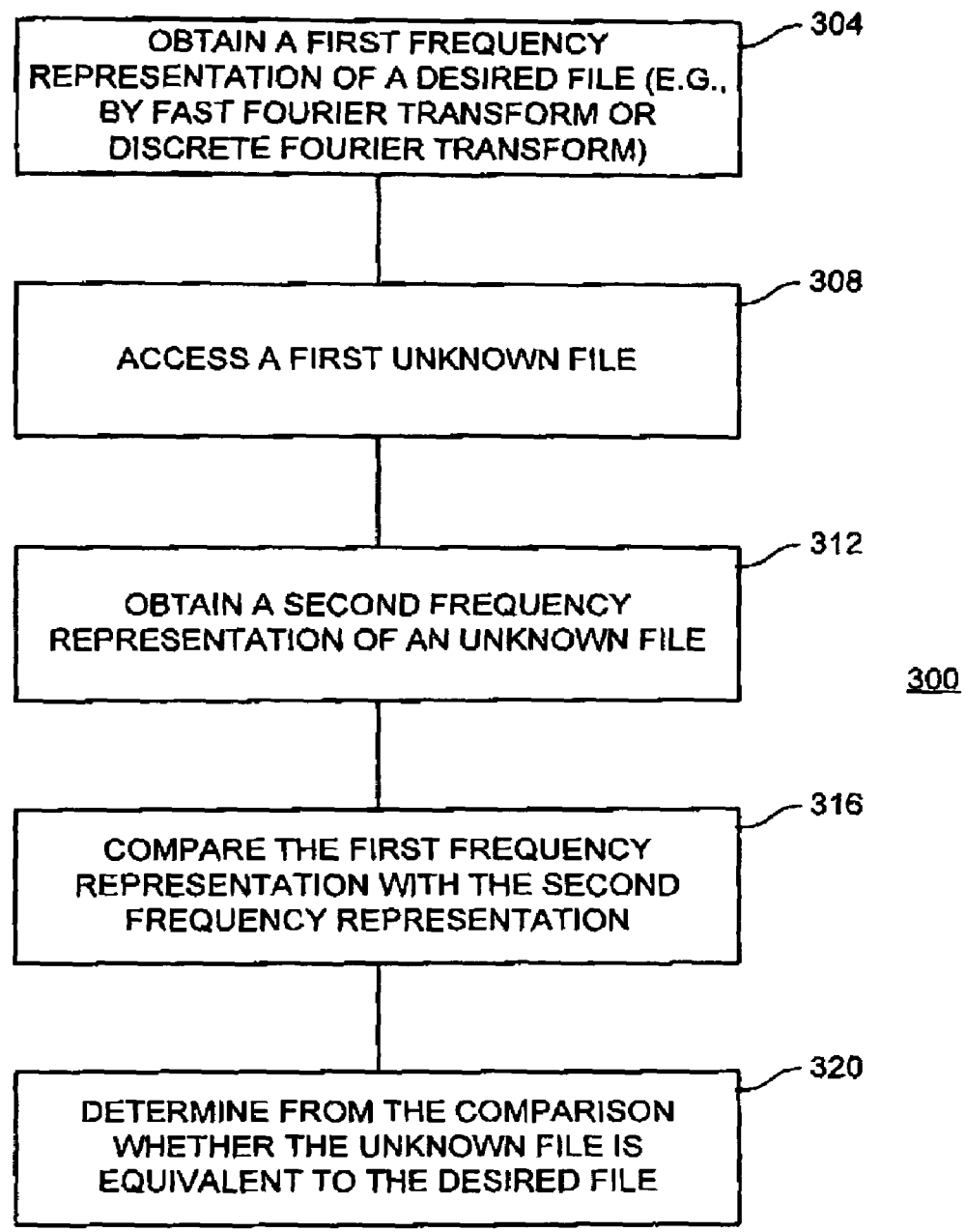
FIG. 3 provides a flowchart illustrating a method of identifying an unknown file according to one embodiment of the invention.

FIG. 3 illustrates an embodiment of the invention for identifying an unknown file. In some instances, it is desirable to take a known file and search for other occurrences of that known file. Typically, this is accomplished utilizing a file name associated with file data and searching based on that file name. There is an assumption that the file name has not been mislabeled for that file data. As noted above in the case of Napster bombing, this is an incorrect assumption as file names are often purposely listed incorrectly so as to dupe the listening public into downloading a new artist's song. Thus, this embodiment of the invention can be utilized to search based on frequency characteristics of a song as opposed to a simple file name which can easily be corrupted.

In FIG. 3, a method 300 is shown illustrating an embodiment of the invention for identifying an unknown file. In block 304, a desired file is obtained and a first frequency representation of that file is generated. For example, this can be performed by obtaining a video file and generating an FFT based on the first five minutes of the audio portion of that video file. Alternatively, the FFT could be performed on the video portion of the video file. Thus a frequency representation indicative of that video file would be generated as a fingerprint. In block 308, an unknown file in a file directory is accessed. For example, a caching server which stores multiple files for downloading by commercial customers in a video distribution network could be accessed and a first unknown file from that caching server obtained. In block 312, a frequency representation of this unknown file is generated so as to produce a second frequency representation for comparison to the frequency representation earlier generated for the desired file. Consequently, in block 316 the comparison of the first frequency representation of the desired file is performed with the second frequency representation of the unknown file. In block 320 a determination is made from this comparison as to whether the unknown file is equivalent to the desired file a predetermined standard could be utilized to make this determination. It is envisioned that a user could be given a template of characteristics to choose from in determining the criteria to be used in the standard. Alternatively, the standard could be predefined by a standardizing body which established criteria for determining when two files are equivalent. Once the determination is made, a user could act upon the conclusion, such as deleting a redundant file or performing further comparisons to determine whether additional portions, such as the entire data file, are equivalent. Thus, a program could be devised to compare initial portions of fingerprints for eliminating files that are clearly dissimilar and then through a repetitive process determining those files that are actual equivalents based upon subsequent comparisons.

Figure 4:
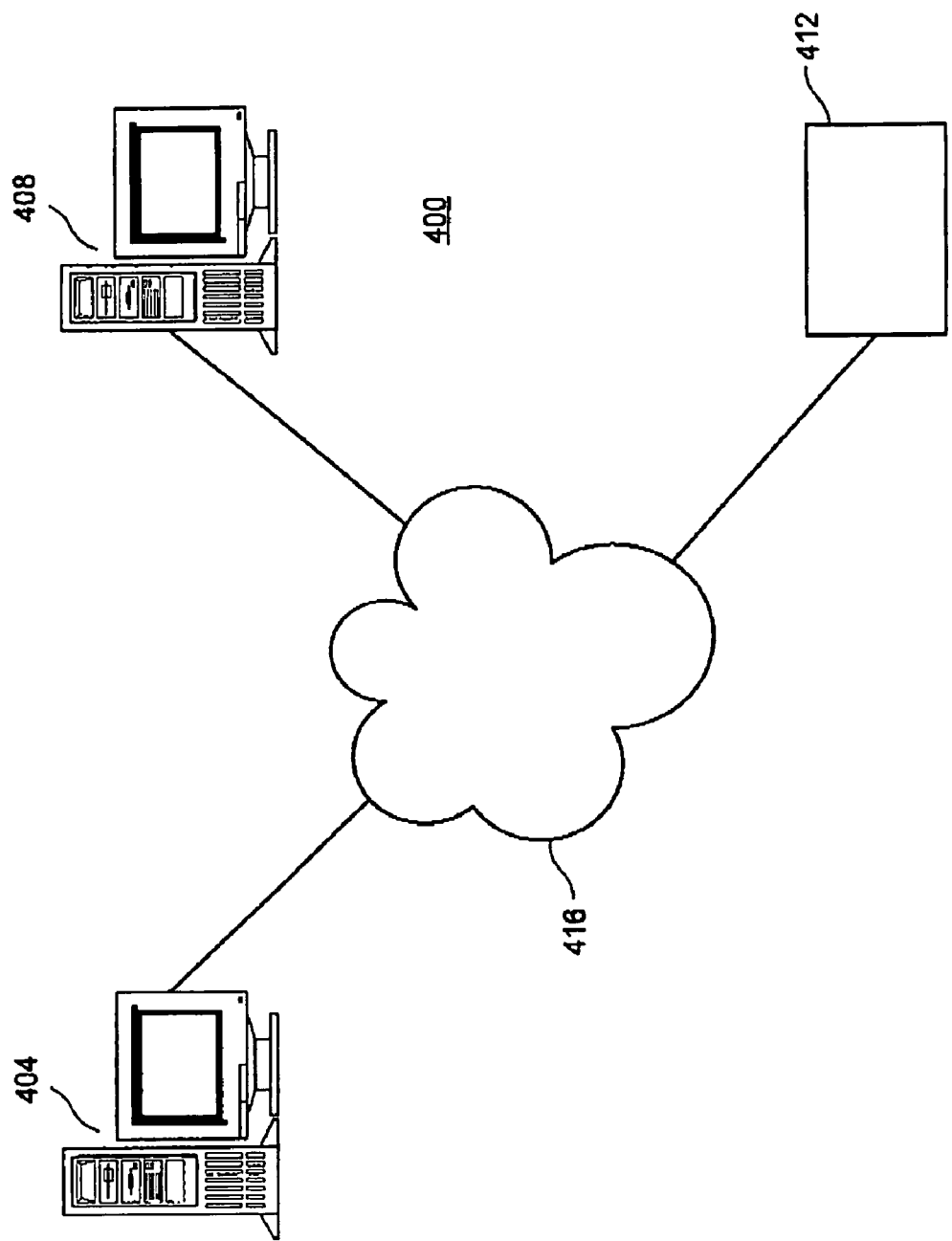
FIG. 4 illustrates a system for accomplishing the methods illustrated in FIGS. 1, 2 and 3.

FIG. 4 illustrates an embodiment of the invention that could be used for accomplishing the methods of FIGS. 1, 2, and 3. In FIG. 4 a system 400 is illustrated in which a network, such as the internet 416, is shown. In FIG. 4, a first computer 412 housing a database of files is shown. Furthermore, a second computer 404 is shown which can communicate through the network 416 with first computer 412. In addition, a third computer 408 is shown which can communicate with both computers 404 and 408 via the network 416. As but one example, this could embody a video streaming network in which computer 404 serves as a caching server for maintaining copies of video files that are distributed to customers, such as a customer using third computer 408. A master computer or master database could be accomplished with first computer 412. Thus, from time to time, the master computer will desire to eliminate redundant files that are stored on its own database in first computer 412 as well as on a remote computer such as caching server 404. With this system, peer-to-peer communications could be established between the three computers.

Figure 5:
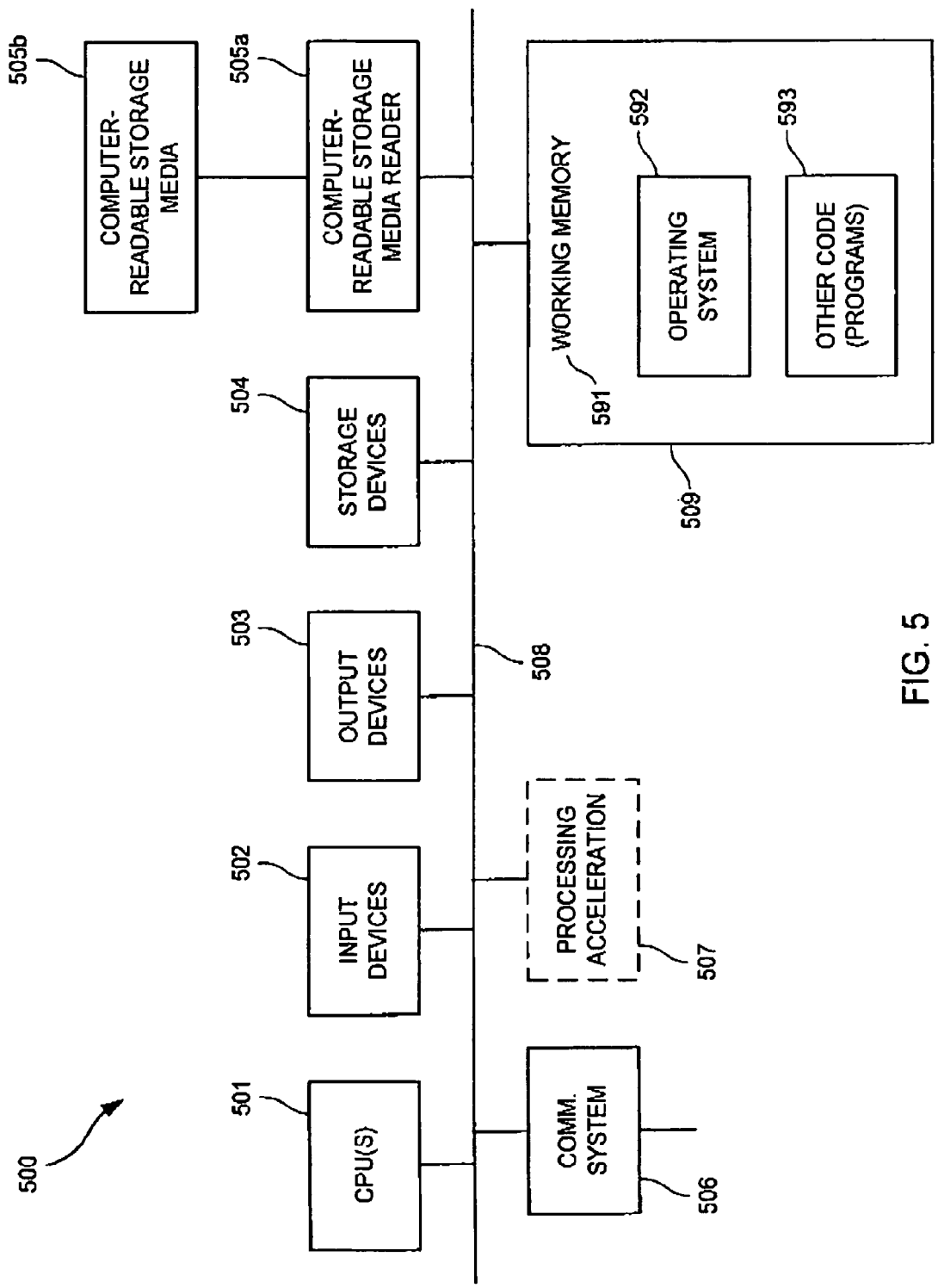
FIG. 5 illustrates a system for accomplishing the components shown in FIG. 4.

FIG. 5 broadly illustrates how individual system elements can be implemented in a separated or more integrated manner within various, generally similarly configured processing systems. System 500 is shown comprised of hardware elements that are electrically coupled via bus 508, including a processor 501, input device 502, output device 503, storage device 504, computer-readable storage media reader 505*a*, communications system 506 processing acceleration (e.g., DSP or special-purpose processors) 507 and memory 509. Computer-readable storage media reader 505*a* is further connected to computer-readable storage media 505*b*, the combination comprehensively representing remote, local, fixed and/or removable storage devices plus storage media, memory, etc. for temporarily and/or more permanently containing computer-readable information, which can include storage device 504, memory 509 and/or any other such accessible system 500 resource. System 500 also comprises software elements (shown as being currently located within working memory 591) including an operating system 592 and other code 593, such as programs, applets, data and the like.

System 500 is desirable as an implementation alternative largely due to its extensive flexibility and configurability. Thus, for example, a single architecture might be utilized to implement one or more servers that can be further configured in accordance with currently desirable protocols, protocol variations, extensions, etc. However, it will be apparent to those skilled in the art that substantial variations may well be utilized in accordance with more specific application requirements. For example, one or more elements might be implemented as sub-elements within a system 500 component (e.g. within communications system 506). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized. Distributed processing, multiple site viewing, information forwarding, collaboration, remote information retrieval and merging, and related capabilities are each contemplated. Operating system utilization will also vary depending on the particular host devices and/or process types (e.g. computer, appliance, portable device, etc.) and certainly not all system 500 components will be required in all cases.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents.

It is thought that the apparatuses and methods of the embodiments of the present invention and many of its attendant advantages will be understood from this specification and it will be apparent that various changes may be made in the form, construction, and arrangement of the parts thereof without departing from the spirit and scope of the invention or sacrificing all of its material advantages, the form herein before described being merely exemplary embodiments thereof.

What is claimed is:

1. A computer implemented method of eliminating a redundant video file, said method comprising:
    obtaining a first frequency representation of a selected video file;
    accessing a first unknown file, wherein the entire data set of said unknown file is stored in computer-readable storage media;
    obtaining a second frequency representation of said unknown file;
    comparing said first frequency representation with said second frequency representation; and
    determining from said comparing whether said unknown file is said selected video file;
    eliminating the entire data set of said unknown file from said computer-readable storage media as a redundant file.

2. The method as described in claim 1 wherein said obtaining said first frequency representation of said desired video file comprises:
    performing a Fast Fourier Transform algorithm.

3. The method as described in claim 1 wherein said obtaining said first frequency representation comprises performing a Discrete Fourier Transform.

4. The method as described in claim 1 wherein said comparing said first frequency representation with said second frequency representation comprises:
    comparing a range of frequencies of said first and second frequency representations.

5. The method as described in claim 1 and further comprising:
    decoding said unknown file.

6. A computer implemented method of determining redundancies in a content object directory, said method comprising:
    accessing a plurality of files stored on a memory, wherein each of said files is configured so as to be identified by a fingerprint;
    for each of said files, determining said fingerprint;
    establishing a redundancy standard so as to indicate whether any two of said fingerprints of said files having non-identical fingerprints are redundant of one another, wherein a user determines a criteria to be used for the standard from a set of different characteristics;
    comparing said fingerprints determined for each of said files;
    determining redundant files based upon said comparing said fingerprints and said redundancy standard.

7. The method as described in claim 6 and further comprising:
    deleting at least one redundant file from said memory.

8. The method as described in claim 6 and further comprising:
    utilizing a Fast Fourier Transform algorithm to compute said fingerprint.

9. The method as described in claim 6 and further comprising:
    utilizing a watermark as said fingerprint.

10. The method as described in claim 6 and further comprising:
    utilizing cyclical redundancy check data as said fingerprint.

11. The method as described in claim 6 wherein said accessing a plurality of files comprises:
    accessing a plurality of files comprising video data.

12. The method as described in claim 6 wherein said accessing a plurality of files comprises:
    accessing a plurality of files comprising audio data.

13. The method as described in claim 6 wherein said establishing a redundancy standard comprises:
    determining a range of frequencies in a pattern of frequencies from a Fast Fourier Transform for comparison of said fingerprints.

14. The method as described in claim 6 and further comprising:
    appending a fingerprint as metadata to at least one directory listing.

15. The method as described in claim 6 and further comprising:
    cataloging in a database said fingerprint with the file from which said fingerprint was generated.

16. The method as described in claim 6 and further comprising:
    obtaining said plurality of files from a caching server utilized as part of a video streaming network.

17. The method as described in claim 6 and further comprising:
    providing a master database upon which video files are stored for video distribution; and
    wherein said accessing a plurality of files comprises accessing a plurality of video filed stored on said master database.

* * * * *